(12) United States Patent
Porras et al.

(10) Patent No.: US 11,586,521 B2
(45) Date of Patent: Feb. 21, 2023

(54) METHODS, APPARATUSES AND SYSTEMS FOR PROVIDING FORENSICS TO MANAGE CONTAINERS

(71) Applicant: SRI International, Menlo Park, CA (US)

(72) Inventors: Phillip A. Porras, Cupertino, CA (US); Prakhar Sharma, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 17/134,605

(22) Filed: Dec. 28, 2020

(65) Prior Publication Data

US 2021/0208991 A1 Jul. 8, 2021

Related U.S. Application Data

(60) Provisional application No. 62/956,408, filed on Jan. 2, 2020.

(51) Int. Cl.
*G06F 11/00* (2006.01)
*G06F 11/34* (2006.01)
(Continued)

(52) U.S. Cl.
CPC .......... *G06F 11/3409* (2013.01); *G06F 11/36* (2013.01); *G06N 3/08* (2013.01);
(Continued)

(58) Field of Classification Search
CPC .. G06F 11/3409; G06F 11/36; G06F 11/3608; G06F 11/3612; G06F 11/366; G06N 10/00; G06N 3/08
See application file for complete search history.

(56) References Cited

U.S. PATENT DOCUMENTS 10,397,255 B1 * 8/2019 Bhalotra ............. H04L 63/1425
10,824,726 B1 * 11/2020 Herman Saffar ..... G06F 21/566
(Continued)

FOREIGN PATENT DOCUMENTS

JP 2018049355 A * 3/2018 .......... G06F 11/0754
JP 2019091236 A * 6/2019 ............... G06N 3/04
(Continued)

OTHER PUBLICATIONS

An et al., "Variational Autoencoder based Anomaly Detection using Reconstruction Probability", Dec. 27, 2015, SNU Data Mining Center, Feb. 2015 Special Lecture on IE (Year: 2015).*
(Continued)

*Primary Examiner* — Michael Maskulinski
(74) *Attorney, Agent, or Firm* — Moser Taboada

(57) ABSTRACT

A method, apparatus and system for providing process-level forensics for a plurality of application containers includes for each of the plurality of application containers; monitoring forensics information of the application container, encoding the monitored forensics information using an encoder of a predetermined encoder/decoder pair to determine a forensics model, decoding the forensics model to determine a reconstructed representation of the forensics information, comparing the reconstructed representation of the forensics information to the monitored forensics information to determine an error and comparing the error to a threshold to determine if an error above the threshold exists. If the error is below the threshold, the forensics model is communicated to a higher-level manager to be used for higher-level management. If the error is above the threshold, the monitored forensics information of the application container is also communicated to the higher-level manager. The predetermined encoder/decoder pair is determined using an autoencoding process.

19 Claims, 11 Drawing Sheets

(51) Int. Cl.
*G06N 10/00* (2022.01)
*G06N 3/08* (2023.01)
*H04L 9/40* (2022.01)
*G06F 11/36* (2006.01)
*H04L 61/103* (2022.01)

(52) U.S. Cl.
CPC ......... *G06N 10/00* (2019.01); *H04L 63/0236* (2013.01); *H04L 63/1425* (2013.01); *H04L 63/20* (2013.01); *H04L 61/103* (2013.01); *H04L 63/029* (2013.01)

(56) References Cited

U.S. PATENT DOCUMENTS

| | | | | |
|---|---|---|---|---|
| 11,106,560 | B2* | 8/2021 | Vijendra | G06F 11/3024 |
| 2017/0249462 | A1* | 8/2017 | Permeh | G06N 20/00 |
| 2018/0293501 | A1* | 10/2018 | Ambati | G06N 5/02 |
| 2020/0285555 | A1* | 9/2020 | Suh | G06F 11/3466 |
| 2021/0058424 | A1* | 2/2021 | Chang | H04L 63/1441 |

FOREIGN PATENT DOCUMENTS

| | | | | |
|---|---|---|---|---|
| KR | 20150038500 | A | 4/2015 | |
| KR | 1020150038500 | | 4/2015 | |
| KR | 20150128876 | A | 11/2015 | |
| KR | 1020150128876 | | 11/2015 | |
| KR | 1940029 | B1 * | 1/2019 | G06K 9/6256 |
| KR | 20190015273 | A | 2/2019 | |
| KR | 1020190015273 | | 8/2020 | |

OTHER PUBLICATIONS

Madani et al., "Robustness of Deep Autoencoder in Intrusion Detection under Adversarial Contamination", Apr. 10-11, 2018, HoTSoS '18, Association for Computing Machinery (Year: 2018).*

Clancy, T.Charles et al., Securing Cloud Containers through Intrusion Detection and Remediation [online], Aug. 1, 2017 (Year: 2017).*

Preuveneers, Davy et al., Chained anomaly detection models for federated learning: An intrusion detection case study [online], Dec. 18, 2018 (Year: 2018).*

Chong Zhou and Randy C. Paffenroth, Anomaly Detection with Robust Deep Autoencoders, Proceedings of the 23rd ACM SIGKDD International Conference on Knowledge Discovery and Data Mining, pp. 665-674(Aug. 2017.) (Year: 2017).*

Notice of Allowance received from Korean Intellectual Property Office (KIPO) for Korean Application No. 10-2020-0189426; 3 pages.

* cited by examiner

Network Transmission

| Syscall avg | Naïve | VAE |
|---|---|---|
| 400 | 76 Kbps | 60 Bps |
| 800 | 153 Kbps | 61 Bps |
| 1200 | 227 Kbps | 61 Bps |

METHODS, APPARATUSES AND SYSTEMS FOR PROVIDING FORENSICS TO MANAGE CONTAINERS

CROSS-REFERENCE TO RELATED APPLICATIONS

This application claims benefit of and priority to U.S. provisional patent application Ser. No. 62/956,408, filed Jan. 2, 2020, which is herein incorporated by reference in its entirety.

FIELD

Embodiments of the present principles generally relate to container network applications and, and more particularly, to providing process-level forensics for managing application containers of, for example, container networks.

BACKGROUND

Containers are utilized widely to decompose complex production Internet services into manageable (componentized) microservices. The use of containerization technologies for virtual application deployment, particularly for the scalable instantiation of production microservices, has grown at an astonishing rate. However, while inter-container networking is indispensable for microservices, the question of the operational stability of container networking has not been well scrutinized. For example, there has not been a lot of work done in the area of process-level container forensics for facilitating incident detection and damage assessment.

Notably, process-level activity forensics collection typically increases CPU, IO, network transport, and data storage requirements. In addition, streaming forensics data to data repositories for indexing consumes bandwidth and storage and such workload intensity increases syscall volume, which further increases forensics costs. As container parallel orchestration increases, digital forensics production loads may lead to overload and saturation.

SUMMARY

Embodiments of methods, apparatuses and systems for providing process-level forensics for managing application containers of, for example, container networks are disclosed herein.

In some embodiments a method for determining a global encoder/decoder pair for one or more application containers includes monitoring forensics information of an application container known to be operating in a stable manner, applying an autoencoding process to the monitored forensics information of the application container known to be operating in the stable manner to determine an encoder/decoder pair that keeps a maximum of the forensics information when encoding and has a minimum of reconstruction error when decoding, and applying the determined encoder/decoder pair to the monitored forensics information of the application container known to be operating in the stable manner to determine a training forensics model for the application container known to be operating in a stable manner, wherein the training forensics model is used as a basis of comparison to determine container health of one or more containers.

In some embodiments a method for determining a global encoder/decoder pair for application to respective forensic information of application containers having like functionality to determine a respective forensics model for each of the application containers includes monitoring forensics information of an application container known to be operating in a stable manner, applying an autoencoding process to the monitored forensics information of the application container known to be operating in the stable manner to determine an encoder/decoder pair that keeps a maximum of the forensics information when encoding and has a minimum of reconstruction error when decoding, applying the determined encoder/decoder pair to the monitored forensics information of the application container known to be operating in the stable manner to determine a training forensics model for the application container known to be operating in a stable manner, and applying the determined encoder/decoder pair to forensics information of at least one other application container to determine a respective forensics model for the application container.

In some embodiments the method can further include summarizing the forensics information before applying the autoencoding process. In some embodiments the summarizing can include at least one of categorizing the forensics information and vectorizing the forensics information by a time quantum.

In some embodiments, the autoencoding process of the method can include at least one of a vanilla autoencoding process, a variational autoencoding process, and a variational autoencoding process for time series anomaly detection.

In some embodiments the method can include communicating at least one of a training forensics model and respective forensics models to a higher-level manager for higher-level management of the application containers.

In some embodiments, at least one of a training forensics model and respective forensics models comprise a latent code determined by an encoding process of the encoder/decoder pair, wherein the encoding process includes a neural network.

In some embodiments, a method for providing process-level forensics for a plurality of application containers of container networks includes, for each of the plurality of application containers; monitoring forensics information of the application container, encoding the monitored forensics information using an encoder of a predetermined encoder/decoder pair to determine a forensics model representative of the monitored forensics information of the application container, decoding the forensics model using the decoder of the predetermined encoder/decoder pair to determine a reconstructed representation of the forensics information, comparing the reconstructed representation of the forensics information to the monitored forensics information to determine an error, comparing the determined error to a predetermined threshold value to determine if an error exists above the predetermined threshold value, if the error is below the threshold value, communicating the forensics model representative of the monitored forensics information of the application container to a higher-level manager to be used for higher-level management of at least one of the plurality of application containers and the container networks, and if an error above the predetermined threshold value is determined to exist, communicating the forensics model representative of the monitored forensics information of the application container and the monitored forensics information of the application container to the higher-level manager to be used for higher-level management of at least one of the plurality of application containers and the container networks.

In some embodiments in accordance with the present principles, the method can further include summarizing the forensics information before encoding the monitored forensics information, wherein the summarizing can include at least one of categorizing the forensics information, and vectorizing the forensics information by a time quantum.

In some embodiments in accordance with the present principles, the predetermined encoder/decoder pair of the method can be determined by applying an autoencoding process to forensics information of an application container known to be operating in a stable manner.

In some embodiments in accordance with the present principles, an apparatus for determining a global encoder/decoder pair for application to respective forensic information of application containers having like functionality to determine a respective forensics model for each of the application containers includes a summarizing module monitoring forensics information of an application container known to be operating in a stable manner that is representative of the application containers and an autoencoder module. In some embodiments the autoencoder module is configure to apply an autoencoding process to the monitored forensics information of the application container known to be operating in the stable manner to determine an encoder/decoder pair that keeps a maximum of the forensics information when encoding and has a minimum of reconstruction error when decoding, apply the determined encoder/decoder pair to the monitored forensics information of the application container known to be operating in the stable manner to determine a training forensics model for the application container known to be operating in a stable manner, and apply the determined encoder/decoder pair to forensics information of at least one other application container to determine a respective forensics model for the application container.

In some embodiments, the summarizing module of the apparatus further categorizes the forensics information and vectorizes the forensics information by a time quantum.

In some embodiments in accordance with the present principles, an apparatus for providing process-level forensics for a plurality of application containers of container networks, includes for each of the plurality of application containers; a summarizing module monitoring forensics information of the application container, an encoder of a predetermined encoder/decoder pair encoding the monitored forensics information to determine a forensics model representative of the monitored forensics information of the application container, the decoder of the predetermined encoder/decoder pair decoding the forensics model to determine a reconstructed representation of the forensics information, and a publisher/error evaluator module.

In some embodiments, the publisher/error evaluator module is configured to compare the reconstructed representation of the forensics information to the monitored forensics information to determine an error, compare the determined error to a predetermined threshold value to determine if an error exists above the predetermined threshold value, if no error above the predetermined threshold value is determined to exist, communicate the forensics model representative of the monitored forensics information of the application container to a global manager module to be used for higher-level management of at least one of the plurality of application containers and the container networks, and if an error above the predetermined threshold value is determined to exist, communicate the forensics model representative of the monitored forensics information of the application container and the monitored forensics information of the application container to the global manager module to be used for higher-level management of at least one of the plurality of application containers and the container networks.

In some embodiments, the apparatus can further include a storage device for storing at least one of the monitored forensics information of the application containers, reconstructed forensics information of the application containers, and determined forensics model representations.

In some embodiments, the apparatus can further include a global manager module which determines a global model of operating characteristics of the plurality of application containers of the container networks using at least forensics models and forensics information received from the plurality of application containers. In some embodiments, the global manager module determines if the operation of at least one of the plurality of application containers has drifted using at least forensics models and forensics information received from the plurality of application containers and applies at least one of an unsupervised k-means cluster analysis, pairwise cosine similarity analysis or other similarity metrics to determine if the operation of at least one of the plurality of application containers has drifted.

In some embodiments, the global manager module determines a reason for a determined excessive error in at least one application container determined to have an error that exceeds the predetermined threshold using at least one of forensics models and forensics information received from the at least one application container. In some embodiments, the global manager module determines the reason for the excessive error to be a deficient training model and can cause a retraining of at least one training model, which can include an encoder/decoder pair that keeps a maximum of the forensics information when encoding the monitored forensics information and has a minimum of reconstruction error when decoding the encoded forensics information.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

Figure 1:
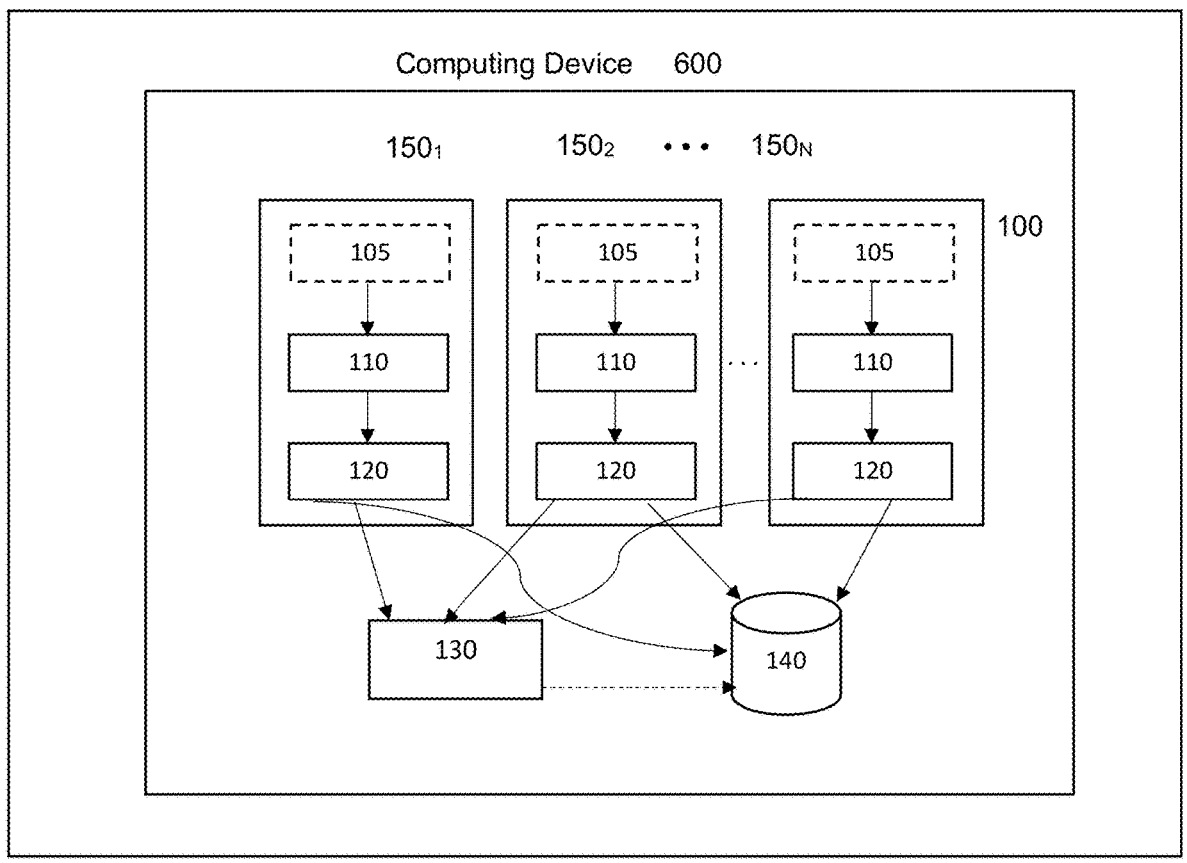
FIG. 1 depicts a high-level block diagram of a container forensics system in accordance with an embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relate to methods, apparatuses and systems for providing forensics for managing application containers of, for example, container networks. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to specific container applications and container networks, such teachings should not be considered limiting. Embodiments in accordance with the present principles can function with substantially any container applications and container networks.

Embodiments of the present principles comprise a deep learning method in which a per-container model of operational stability for container networks is determined. In some embodiments, container forensics are cached, and at regular intervals are evaluated to determine if the application is operating in a known stable manner to, for example, determine container health. In accordance with embodiments of the present principles, a stable operation of at least one application container can be defined herein as a desired operation or outcome of at least one or more application containers. In accordance with embodiments of the present principles, container health can be defined herein as an operational status of a container, for example, how the services of a container are running and/or whether or not a container is suspected of containing malware. In addition, in some embodiments the phrase "container health" can include a readiness status of the services of a container.

In some embodiments, a federated logging approach can be utilized by a container forensics system of the present principles to reduce the amount of forensics data being transmitted to ground systems while maintaining the ability to report stable and unstable conditions. In some embodiments, instead of having every container push its forensics so that a global analysis can be done on the ground, each container builds a model of how it is behaving and determines if it is behaving in a normal pattern, then, only the model can be pushed to or pulled by a global manager instead of communicating the forensics data to the global manager. Accordingly, a local check is done at the container level and a decision on what is transmitted (either a model, the forensics or both) can be made at the container level.

In some embodiments, a managerial layer can leverage data from a large number of containers to determine what a model may look like when a container is stable. A managerial layer can then detect when something is outside the stable model and record and analyze many aspects of what the container does for further analysis. The managerial layer can cause corrective action to be taken to attempt to determine and correct a reason why an application container can be operating in an unstable manner. For example, in some embodiments, a managerial layer can cause a retraining of a model or a determined encoder/decoder pair or the repair of an application container (described in greater detail below).

In some embodiments, a decision on the transmittal of a model or of forensics information from any given container can be made at a container level, at the managerial level or both (push or pull). For example, from a global perspective, if some containers that are running the same applications are behaving out of the norm, from a local layer, there is no need to publish anything at that moment (e.g., where it has already been published 5 times before and nothing has changed). Instead, a decision can be made by the managerial layer to publish just the models. Accordingly, the managerial level can push the information from the container level or pull the information, for example from a container or a storage device, based on its own assessment. In some embodiments, publication of the models and forensics information can also be made according to policies specific to the type of systems utilizing the container security system. In some embodiments, authentication events, triggered events and information regarding users of a container can also be published along with the models.

FIG. 1 depicts a high-level block diagram of a container forensics system 100 that can be applied in application containers of a container network (not shown) in accordance with an embodiment of the present principles. The container forensics system 100 of FIG. 1 can be applied to a least one of a plurality of application containers $150_1$-$150_N$ (collectively application containers 150). In the embodiment of FIG. 1, each of the application containers 150 illustratively comprises an optional summarizing module 105, an autoencoder module 110 and a publisher/error evaluator module

120. The container forensics system 100 of FIG. 1 further illustratively comprises, a global manager module 130 and a storage device 140, in the embodiment of FIG. 1, illustratively depicted outside of the application containers 150. As further depicted in FIG. 1, embodiments of a container forensics system of the present principles, such as the container forensics system 100 of FIG. 1, can be implemented via a computing device 600 in accordance with the present principles (described in greater detail below). Although in the embodiment of the container forensics 100 of FIG. 1, the publisher/error evaluator module 120 is depicted as single component, a publisher/error evaluator module of the present principles can comprise multiple, separate components.

Although in the embodiment of the container forensics system 100 of FIG. 1, the application containers 150 are illustrated as comprising the optional summarizing module 105, the autoencoder module 110, and the publisher/error evaluator module 120, alternatively or in addition, in some embodiments, a container forensics system of the present principles, including the optional summarizing module 105, the autoencoder module 110, and the publisher/error evaluator module 120, can comprise respective services/modules provided externally to each application container 150 and do not have to reside within each application container 150 as illustrated in FIG. 1. That is, in some embodiments of a container forensics system of the present principles, at least the optional summarizing module 105, the autoencoder module 110, and the publisher/error evaluator module 120 can be services/modules provided externally to each application container 150 and do not have to reside within each application container 150. In some embodiments, the container forensics system of the present principles, such as the container forensics system 100 of FIG. 1 including the optional summarizing module 105, the autoencoder module 110, the publisher/error evaluator module 120, the global manager module 130 and the storage device 140, can be provided to application containers as a service (described in further detail below).

In accordance with at least some embodiments of the present principles, application container forensics information/data can be monitored/collected, in some embodiments, at regular intervals (e.g., time quantum) at least at a container level to determine a model of stable behavior for application containers and to determine if the application container is operating in a known, stable manner using the determined model. In accordance with embodiments of the present principles, forensics information/data can include, but is not limited to, substantially any operational function/ characteristic of an application container that is repeatable and is able to be standardized and compared with subsequent iterations of the operational function/characteristic. For example, in some embodiments, forensics information can include at least one of system calls (syscalls) information, container resource utilization information, process activity information, file access information, network activity information, user identity management, direct access events, file attribute events, system configuration events, input-output control (IOCTL) usage and the like. Furthermore, forensic information can include application specific log production, such as VAR log and Apache 2.log. In such embodiments a pattern of behavior, for example, at the error log can be monitored to determine if Apache is operating in a stable manner. In addition, in some embodiments, firewall rules policy violations and the like can be vectorized and implemented as forensics information.

Figure 2A:
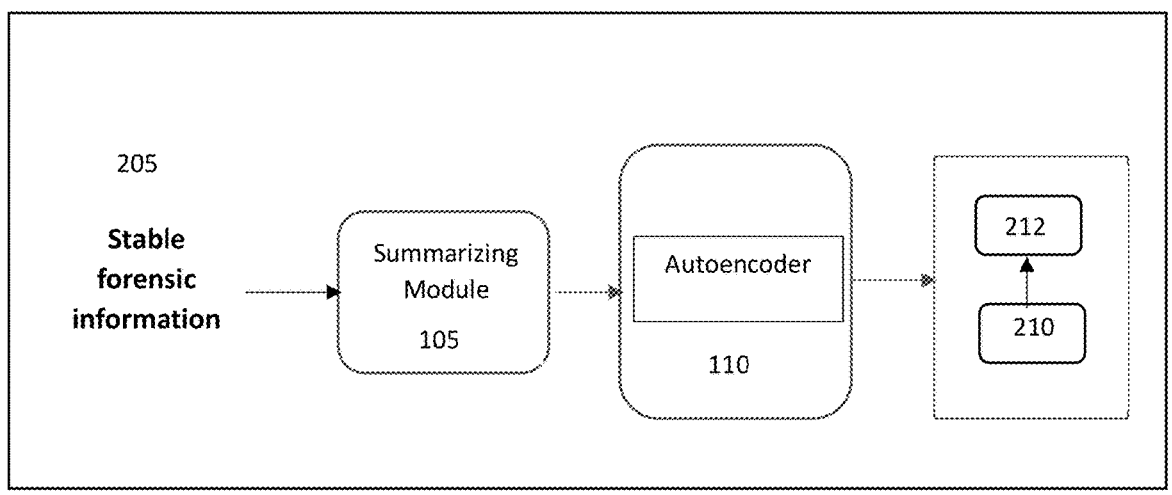
FIG. 2A depicts a functional diagram of an embodiment of a container forensics system of the present principles, such as the container forensics system 100 of FIG. 1, providing an application container model training service in accordance with an embodiment of the present principles.

FIG. 2A depicts a functional block diagram of an embodiment of a container forensics system of the present principles, such as the container forensics system 100 illustrated in FIG. 1, providing an application container model training service for application containers having like functionality or of like kind in accordance with an embodiment of the present principles. As depicted in FIG. 2A, for a plurality of application containers having similar functionality or of like kind such that forensics information of the plurality of the application containers are similar within a threshold, a respective, optional summarizing module 105 can monitor forensics information 205 of at least one associated application container 150 known to be operating in a stable manner. In accordance with embodiments of the present principles, a stable operation of at least one application container can be defined herein as a desired operation or outcome of at least one or more application containers.

In the embodiment of FIG. 2A, the forensics information 205 from the at least one stable operating application container can be categorized by the optional summarizing module 105. In some embodiments the summarizing module 105 can also vectorize the categorized forensics information by, in some embodiments a time quantum. In some embodiments of the present principles, the forensics information can be categorized and vectorized via substantially any forensics characteristics. For example, in some embodiments the optional summarizing module 105 can separate forensics information into categories by type and a count can be made of each type of forensics information in each category. Alternatively or in addition, in some embodiments instead of looking at single sequences of forensics information, n-gram sequences of forensics information (i.e., system calls) can be produced to categorize and vectorize the forensics information by counting the n-gram sequences. Alternatively or in addition, in some embodiments metadata of the forensics information, such as errors or successes of for example operational features of respective application containers, can be counted to categorize and vectorize the forensics information. Alternatively or in addition, arguments of, for example, numbers of accessed files and directories during, for example, system calls can be incorporated to categorize and vectorize the forensics information of a respective application container. In accordance with embodiments of the present principles, the monitoring/ collection of forensics information of respective application containers can be performed per time quantum. Such time quantum can be determined experimentally and via iteration to determine a time quantum that delivers a best performance for a container forensics system of the present principles. For example, in some embodiments, a time quantum of the present principles is defined as an observational interval that is a configurable parameter that may be subject to adjustment depending on the volume of application forensic events and a cache/storage size. In some embodiments, the more active the application, the greater the storage and summarization cost a time quantum can impose as the time quantum is increased. Time quantums can also affect the responsiveness of a container forensics system of the present principles in reporting instabilities. In some embodiments of the present principles, time quantum lengths have been limited to 1 minute or less.

Although the above description provides a few examples of how forensics information can be categorized and/or vectorized, the above description and examples should not be considered limiting. Forensics information can be categorized and/or vectorized by any known or yet to be discovered methods and/or processes for categorizing and/or vectorizing forensics information, which can be implemented in embodiments of the present principles. Even further, although in the embodiment of FIG. 2A the forensics information from the application container 150 known to be operating in a stable manner is categorized and vectorized by the summarizing module 105, in some alternate embodiments, forensics information can be received by the autoencoder module 110 without having been summarized by an optional summarizing module 105 of the present principles.

In the embodiment of FIG. 2A, the autoencoder module 110 uses the forensic information of the application container operating in a stable manner from, for example, the optional summarizing module 105 to determine an encoder 210/decoder 212 pair to determine a respective forensics model which can be used in determining if application containers are operating in a stable manner in accordance with the present principles. That is, in the embodiment of FIG. 2A, an autoencoding process is applied to the forensics information of the application container that is operating in a stable manner by the autoencoder module 110. The autoencoder module 110 of the embodiment of FIG. 2A determines an encoder 262/decoder 264 pair that keeps a maximum of the forensics information when encoding and has the minimum of reconstruction error when decoding. The determined encoder 262/decoder 264 pair can be communicated, for example in some embodiments, by a publisher/error evaluator module of the present principles, such as the publisher/error evaluator module 120 of FIG. 1, to at least every application container of a like kind and/or functionality to be used to detect stability of the operation of application containers (described in greater detail below). The above process of FIG. 2A can be applied for determining an encoder/decoder pair for all different types of application containers of respective like kinds and/or functionalities.

In determining the encoder 262/decoder 264 pair, the autoencoder module 110 can determine a forensics training model, $M_T$, for the stably operating application container for which the forensics information was received. That is, in accordance with the present principles, the autoencoding process can be implemented to determine a forensics training model, $M_T$, representative of the forensics information of the stably operating application container. In some embodiments, the training model, $M_T$, is determined by the encoder 210 as a latent code as described in greater detail in FIG. 2B. The forensics training model, $M_T$, can be communicated to a higher-level manager, such as a global manager module of the present principles, to be used for high-level management of application containers of, for example a container network. Such training procedure described above can be applied to other application containers not known to be operating in a stable manner to determine a respective forensics operational model for each of the application containers, which respective forensics operational model can be compared to the forensics training model, $M_T$, by, in some embodiments a global manager module (described in greater detail below).

Figure 2B:
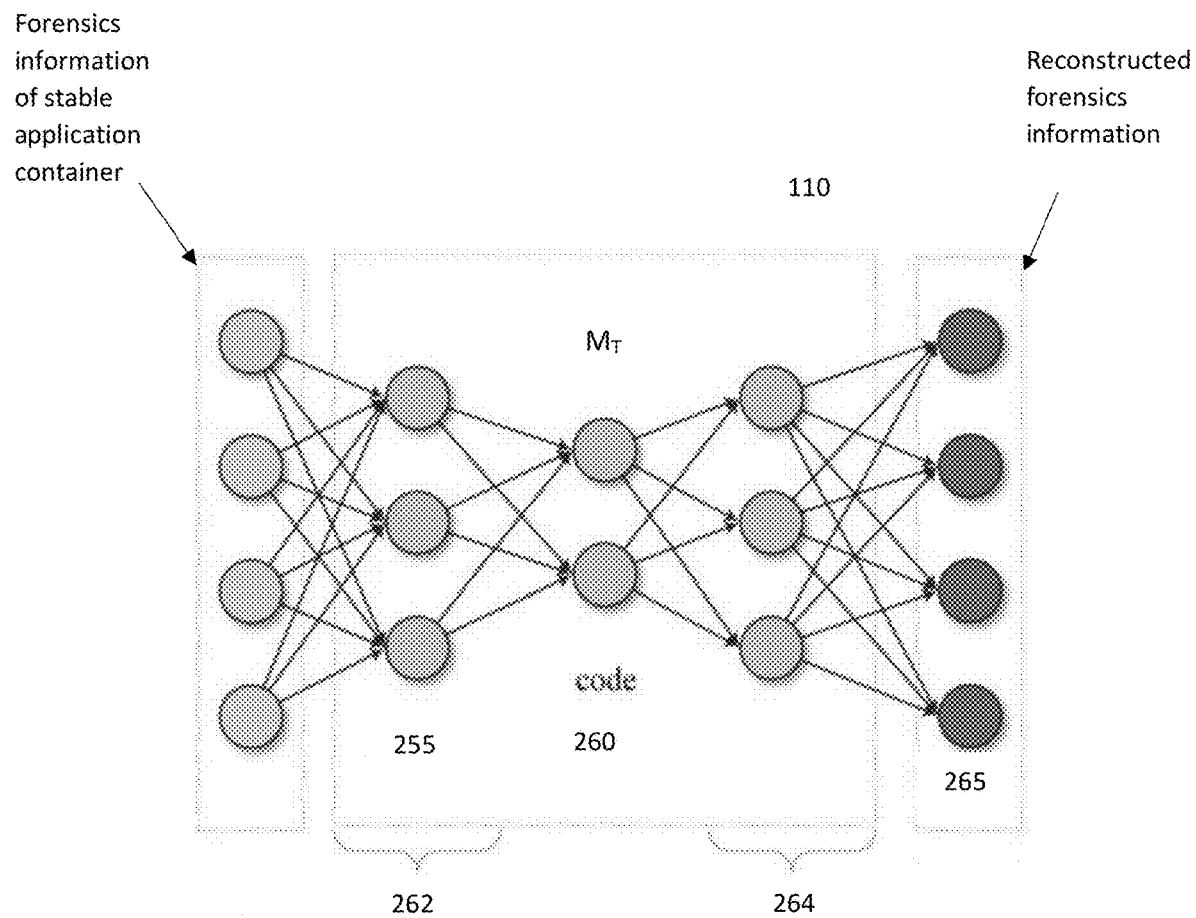
FIG. 2B depicts a functional block diagram of the operation of an autoencoder of the present principles, such as the autoencoder 110 of FIG. 1, in accordance with an embodiment of the present principles.

For example, FIG. 2B depicts a functional block diagram of the operation of an autoencoder of the present principles, such as the autoencoder 110 of FIG. 1 (e.g., encoder 262/decoder 264 pair of FIG. 2A). In some embodiments, the autoencoder can depend on at least the forensics information to be processed and in some embodiments can include at least one of a vanilla autoencoder, a variational autoencoder, and a variational autoencoder for time series anomaly detection. As depicted in FIG. 2B, the input to the autoencoder 110 can consist of forensics information representing a stable operating state of a subject application container. In some embodiments, the encoder 262 can implement a neural network, such as a convolutional neural network (CNN) or a long short-term memory (LSTM), to convert the received representative data (e.g., forensics information) into a representation of the data 255, in some embodiments a compressed representation of the data. In the latent space between the encoder 262 and the decoder 264, the representation of the data 255 is further processed into a latent code 260, a most efficient representation of the data representation of the stable operating features (i.e., forensics information) of a stably operating application container (not shown). In embodiments in which the input to the autoencoder includes forensics of an application container known to be operating in a stable manner, the latent code is defined as the above described training model, $M_T$. The latent code 260 can then be process (i.e., processed using a neural network) by the decoder 264 to determine a reconstructed representation 265 of the input data. The determined training model, $M_T$, can be communicated, for example in some embodiments, by a publisher/error evaluator module of the present principles, such as the publisher/error evaluator module 120 of FIG. 1, to a global manager, such as a global manager module 130 of the present principles, for performing higher-level management of at least one application container of, for example, a container network. In some embodiments of the present principles, the determined training model, $M_T$, can be communicated, for example in some embodiments, by a publisher/error evaluator module of the present principles, such as the publisher/error evaluator module 120 of FIG. 1, to every application container of, for example, a container network for use in comparison with other forensic models of other application containers to determine if the operation of at least one of the other application containers is operating in a stable manner (described in further detail below).

Figure 3:
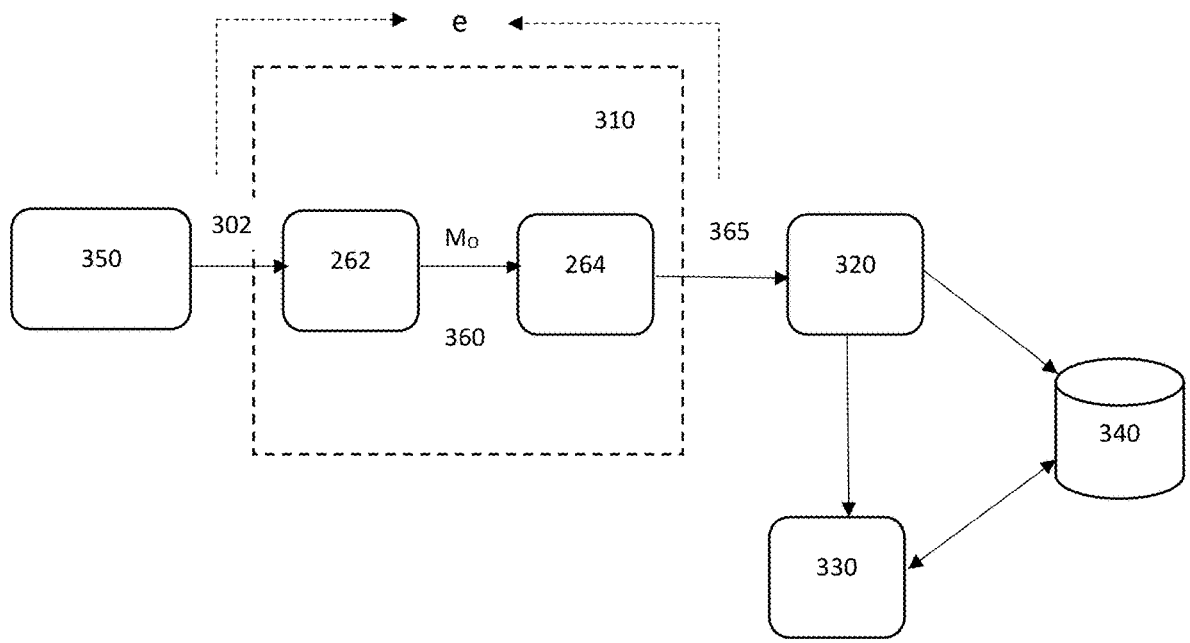
FIG. 3 depicts a high-level functional diagram of a container forensics system of the present principles being provided as a service to an application container in accordance with an embodiment of the present principles.

FIG. 3 depicts a high-level functional diagram of a container forensics system 300 of the present principles being provided as a service to an application container 350 in accordance with an embodiment of the present principles. The container forensics system 300 of FIG. 3 illustratively comprises an autoencoder module 310, in the embodiment of FIG. 3 depicted as the previously determined encoder 262/decoder 264 pair, and a publisher/error evaluator module 320. The container forensics system 300 of FIG. 3 is depicted without a summarizing module of the present principles to illustrate that embodiments of the present principles can be implemented without the optional summarizing module of the present principles. In such embodiments, forensics information can be received by an autoencoder module of the present principles without being summarized or can be summarized by a separate service.

In the container forensics system 300 of FIG. 3, after training and during normal operation of an application container, such as the application container 350, forensics information 302 representative of the operation of the application container 350 is encoded by the encoder 262 of the encoder 262/decoder 264 pair determined, for example, during a training process as depicted in FIG. 2A. The encoder 262 processes the forensics information into a latent code 360 representative of the forensics information of the operating characteristics of the application container 350. In some embodiments in accordance with the present principles, the determined latent code 360 can be defined as a respective operating model, $M_O$, representative of the operating characteristics of the application container 350 of FIG. 3. The operating model, $M_O$, determined by the encoder 262 can be communicated by, for example, the publisher/error evaluator module 320 to the global manage module 330 for performing higher-level managerial functions in accordance with the present principle (described in greater detail below).

In the container forensics system 300 of FIG. 3, the decoder 264 processes the latent code 360 to determine a reconstructed representation 365 of the input forensics information. In the embodiment of FIG. 3, the publisher/error evaluator module 320 compares the reconstructed representation 365 of the input forensics information to the input forensics information to determine if an error, e, above a threshold, r, exists. That is, because the encoder 262/decoder 264 pair was determined using forensics information of a stably operating application container, if the forensics information of the subject application container is consistent with/close enough to, within the threshold, the forensics information of the stably operating application container, when the encoder 262 encodes the forensics information of the application container 350 and the decoder 264 decodes the forensics information of the application container 350, the publisher/error evaluator module 320 will determine that an error, e, above the threshold, r, does not exist between the reconstructed representation 365 of the input forensics information and the input forensics information. The respective application container 350 can then be considered to be operating in a stable manner. However, if the forensics information of the subject application container is not consistent with/close enough to, within the threshold, the forensics information of the stably operating application container, when the encoder 262 encodes the forensics information of the application container 350 and the decoder 264 decodes the forensics information of the application container 350, the publisher/error evaluator module 320 will determine that an error, e, above the threshold, r, exists between the reconstructed representation 365 of the input forensics information and the input forensics information. The respective application container 350 can then be considered to not be operating in a stable manner.

The threshold value, r, of the present principles can be dependent on several factors, including but not limited to, a time quantum at which forensics information is monitored/collected from an application container, the types and function of the application containers, a number of application containers, a number of processes performed by respective application containers, a number and type of forensics information being evaluated, and the like. In some embodiments, the threshold value, r, of the present principles can be determined at least A-priori and experimentally. For example, in one embodiment, a reconstruction error can be monitored for a plurality of iterations/samples at a last training iteration and the mean and standard deviation can be calculated for all those errors. A threshold can then be set as (calculated mean+<some constant)*calculated standard deviation). Alternatively or in addition, in some embodiments, an encoder/decoder pair can be trained on training data and then an evaluation can be performed on the new (clean) data for some restricted number of new samples. Because the samples are new (and the encoder/decoder pair is probabilistic), a reconstruction error would be higher. A threshold can then be set as a mean of the observed reconstruction error.

In instances in which it is determined by, for example, the publisher/error evaluator module 320 that no error, e, above the threshold, r, exists, the publisher/error evaluator module 320 can communicate the determined operating model, $M_O$, representative of the operating characteristics of the respective application container 350, to the global manager module 330 for use in higher-level management of application containers (described in greater detail below). In instances in which it is determined by, for example, the publisher/error evaluator module 320 that an error, e, above the threshold, r, exists, the publisher/error evaluator module 320 can communicate the determined operating model, $M_O$, representative of the operating characteristics of the respective application container 350, and the raw forensics information of the application container 350 to the global manager module 330 for use in higher-level management of application containers (described in greater detail below). In some embodiments, the publisher/error evaluator module 320 can communicate the determined operating model, $M_O$, representative of the operating characteristics of the respective application container 350, and the raw forensics information of the application container 350 to the storage device 340 for possible later use. For example, in some embodiments, the global management module 130 can request the raw forensics information from the storage device 340 for use in higher-level management of application containers and container networks.

Alternatively or in addition, in some embodiments of the present principles the latent code 360 determined from the forensics information of the application container 350, defined as the operating model, $M_O$, can be compared by, for example, the publisher/error evaluator module 320 to the training model, $M_T$, previously determined from the forensics information of a known, stably operating application container, to determine whether or not the application container 350 is operating in a stable manner. For example, in such embodiments, the latent code operating model, $M_O$, can be compared to a previously determined latent code training model, $M_T$, to determine if an error, e, between the operating model, $M_O$, and the training model, $M_T$, exceeds a threshold, r. In some embodiments, the operating model, $M_O$, and the training model, $M_T$, can be compered using similarity metrics such as cosine similarity and the like. Typically, any deviations from the latent code training model, $M_T$, will induce a large reconstruction error.

In such embodiments, if it is determined by, for example, the publisher/error evaluator module 320 that an error, e, above the threshold, r, does not exist between the operating model, $M_O$, of the respective application container 350 and the previously determined latent code training model, $M_T$, of a stably operating application container, the respective application container 350 can be considered to be operating in a stable manner and the determined operating model, $M_O$, representative of the operating characteristics of the respective application container 350 can be communicated to the global manager module 330 for use in higher-level management of application containers (described in greater detail below). However, if it is determined by, for example, the publisher/error evaluator module 320 that an error, e, above the threshold, r, does exist between the operating model, $M_O$, of the respective application container 350 and the previously determined latent code training model, $M_T$, of a stably operating application container, the respective application container 350 can be considered to not be operating in a stable manner and the determined operating model, $M_O$, representative of the operating characteristics of the respective application container 350 along with the raw monitored/collected forensics information of the application container 350 can be communicated to the global manager module 330 for use in higher-level management of application containers (described in greater detail below).

A global manager module of the present principles, such as the global manager module 130 of FIG. 1 and the global manager module 330 of FIG. 3, is capable of receiving information from each of a plurality of application containers of, for example, container networks. For example and with reference to the training embodiment of FIG. 2A, the global module of the present principles is able to receive at least a training model, $M_T$, determined for an application container known to be operating in a stable manner. With reference to the embodiment of FIG. 3, the global module of the present principles is able to receive forensics information of respective application containers and a respective an operating model, $M_O$, of respective application containers. The global manager module can use the received information to perform higher-level management of, for example, a plurality of application containers of container networks.

For example, in some embodiments, the global manager module of the present principles can determine a global model of a stable operation of the container network and the application containers from at least operating models, $M_O$, of application containers and training models, $M_T$, determined for application containers known to be operating in a stable manner. In some embodiments a global manager module of the present principles can determine if an error, e, exists in the operation of an application container by comparing the operating model, $M_O$, of the application container to received operating models, $M_O$, of at least one peer application container. In such embodiments, the global manager module can compare an error, e, between the models to a predetermined threshold, r, to determine if the respective application container is operating out of tolerance. In some embodiments, the predetermined threshold, r, can be a same threshold, r, as described above with reference to FIG. 3, or alternatively, the global manager module 130 can compare the error, e, to a different predetermined threshold, r. For example, in some embodiments the global manager module can compare the error, e, to a predetermined threshold, r, based on the global view of the application container of container networks. If the error, e, exceeds the threshold, r, the global manager module can run forensics at the managerial level. For example, in such embodiments, the global manager can determine if the operation of an application container that exhibits an error above a threshold has drifted. In such embodiments, the global module can request forensics information from at least the respective application container. Having the forensics information from at least the respective application container, and in some embodiments, some peer application containers, the global manage module can determine container drift according to at least one of an unsupervised k-means cluster analysis, pairwise cosine similarity analysis or other similarity metrics. A global manager of the present principles can perform other analysis metrics such as similarity metrics like Pearson's correlation, cosine similarity, Jaccard similarity, distance metrics like Euclidian distance and Manhattan distance, etc., to determine if an application container is operating in a non-standard manner by using forensics information and models communicated to the global manager model.

In some embodiments, a global manager module of the present principles can determine a reason for a determined excessive error in at least one application container determined to have an error that exceeds the predetermined threshold using at least one of received models and received forensics information received from the at least one application container. In such embodiments, a reason for the excessive error can be determined by the global manager module to be a deficient training model. For example, during training if a stable operating characteristic of an application container is not considered (i.e., monitored/collected) during training, a later exhibition of the non-trained, stable operating characteristic of the application container can result in the determination of an error between the monitored forensics information of the application container and reconstructed forensics information because the encoder/decoder pair of the present principles were determined/trained using forensics information for the application container that did not contain that specific stable operating characteristic of the application container.

In such instances, a global manager module of the present principles having information regarding all of the models of the application containers and the forensics information from the containers considered faulty can determine that a global error exists for all containers when considering the specific operating characteristic and can cause the encoder/decoder pair to be retrained to include such an operating characteristic of the application container. A global manager of the present principles can include further higher-level management functionality including noting patterns of received forensic information identifying patterns of unstable application containers, which could represent cascading compromises, such as the spreading of an attack that occurs once a single container is compromised. In addition, having received data from containers, a global manager module can notice an occurrence of many containers producing sudden shifts from long-term temporal stable performance to unstable performance, which could indicate a potential failure in an underlying infrastructure. In some instance, if single container instabilities occur while other homogeneous containers do not report the same instabilities, a global manager module of the present principles can interpret there to be a container-local compromise or failure. In some embodiments, data received by a global manager module from application containers that depict frequent, consistent instabilities (i.e., observed by the overall percentage of intervals that produce instabilities) could be interpreted by the global manager module to mean that a an insufficient training model exists. In some embodiments, the global manager module of the present principles can determine container health. For example, in some embodiments, having information regarding at least one of a forensics training model, $M_T$, an operational forensics model of a respective application container, and forensics information of the respective application container, a global manager module of the present principles can determine a container health of the respective application container.

The above examples are only some instances of the higher-level functions of a global manager module of the present principles and should not be considered as limiting.

Figure 4:
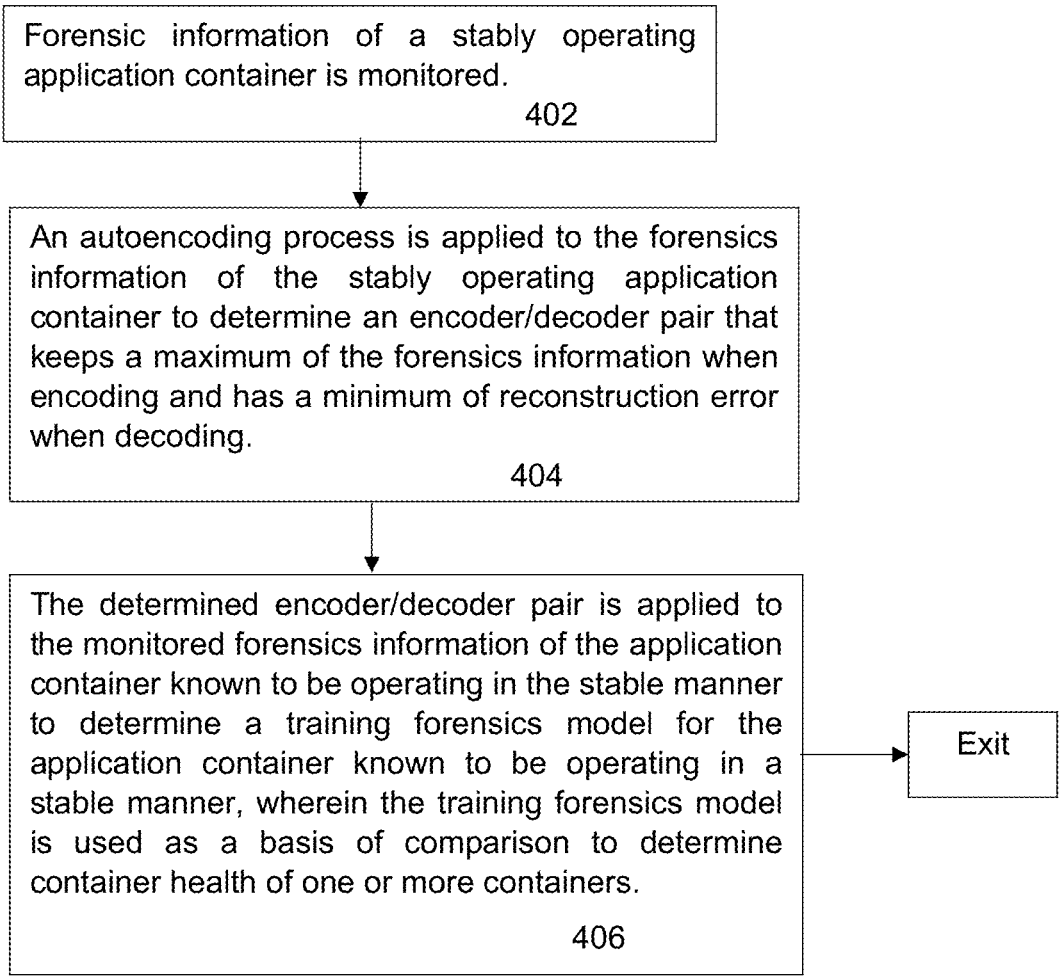
FIG. 4 depicts a flow diagram of a method for determining a global encoder/decoder pair for one or more application containers in accordance with an embodiment of the present principles.

FIG. 4 depicts a flow diagram of a method 400 for determining a global encoder/decoder pair for one or more application containers. The method 400 can begin at 402, during which forensics information of an application container known to be operating in a stable manner is monitored. The method 400 can proceed to 404.

At 404, an autoencoding process is applied to the monitored forensics information of the application container known to be operating in the stable manner to determine an encoder/decoder pair that keeps a maximum of the forensics information when encoding and has a minimum of reconstruction error when decoding. The method 400 can proceed to 406.

At 406, the determined encoder/decoder pair is applied to the monitored forensics information of the application container known to be operating in the stable manner to determine a training forensics model for the application container known to be operating in a stable manner, wherein the training forensics model is used as a basis of comparison to determine container health of one or more containers. In some embodiments, the monitored forensics of the application container known to be operating in a stable manner can be used to determine a status of the services of the application container known to be operating in a stable manner and such information can be compared to the forensic information of other application containers to determine container health of one or more containers. The method 400 can be exited.

In some embodiments, the method 400 can further include summarizing the forensics information before applying the autoencoder process. In some embodiments, the summarizing can include at least one of categorizing the forensics information and vectorizing the categorized forensics information by, in some embodiments, a time quantum.

In some embodiments, the method 400 can further include communicating the training forensics model and respective forensics models to a higher-level manager for higher-level management of the application containers.

In some embodiments of the method 400, at least one of the training forensics model and respective forensics models comprise a latent code determined by an encoding process of the encoder/decoder pair, wherein the encoding process includes a neural network.

Figure 5:
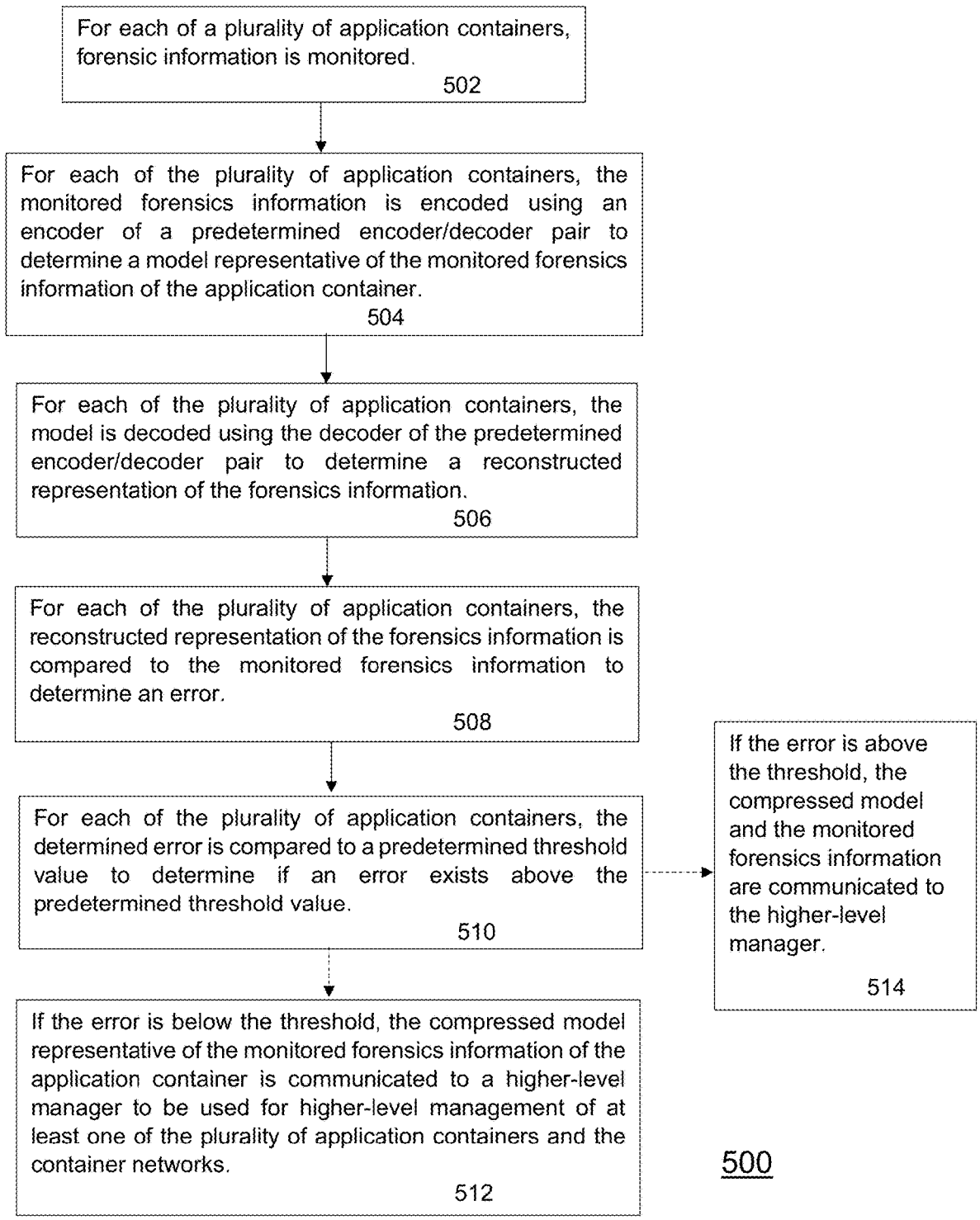
FIG. 5 depicts a flow diagram of a method for providing process-level forensics for a plurality of application containers of container networks in accordance with an embodiment of the present principles.

FIG. 5 depicts a flow diagram of a method 500 for providing process-level forensics for a plurality of application containers of container networks in accordance with an embodiment of the present principles. The method 500 can begin at 502 during which, for each of the plurality of application containers, forensics information is monitored. The method 500 can proceed to 504.

At 504, for each of the plurality of application containers, the monitored forensics information is encoded using an encoder of a predetermined encoder/decoder pair to determine a model representative of the monitored forensics information of the application container. The method 500 can proceed to 506.

At 506, for each of the plurality of application containers, the model is decoded using the decoder of the predetermined encoder/decoder pair to determine a reconstructed representation of the forensics information. The method 500 can proceed to 508.

At 508, for each of the plurality of application containers, the reconstructed representation of the forensics information is compared to the monitored forensics information to determine an error. The method 500 can proceed to 510.

At 510, for each of the plurality of application containers, the determined error is compared to a predetermined threshold value to determine if an error exists above the predetermined threshold value. If no error exists above the predetermined threshold value, the method proceeds to 512. If an error exists above the predetermined threshold value, the method proceeds to 514.

At 512, for each of the plurality of application containers, if the error is below the threshold value, the model representative of the monitored forensics information of the application container is communicated to a higher-level manager to be used for higher-level management of at least one of the plurality of application containers and the container networks. The method 500 can be exited.

At 514, for each of the plurality of application containers, if the error is above the threshold value, both the model representative of the monitored forensics information of the application container and the monitored forensics information of the application container are communicated to the higher-level manager to be used for higher-level management of at least one of the plurality of application containers and the container networks. The method 500 can be exited.

In some embodiments, the method 500 can further include, for at least some of the plurality of application containers, summarizing the forensics information before encoding the forensics information. In some embodiments, the summarizing can include at least one of categorizing the respective forensics information and vectorizing the categorized forensics information by, in some embodiments a time quantum.

In some embodiments, in the method 500 a respective application container is considered to not be operating in a stable manner when it is determined that an error exists above the predetermined threshold value.

In some embodiments, in the method 500 the higher-level manager analyzes at least one of received models and received forensics information communicated from at least one application container determined to have an error that exceeds the predetermined threshold value to determine a reason for the excessive error for the at least one application container.

In some embodiments, in the method 500 the higher-level manager determines a global model of operational characteristics of the plurality of application containers from at least one of received models and received forensics information communicated from the plurality of application containers.

As depicted in FIG. 1, embodiments of a container forensics system of the present principles, such as the container forensics system 100 of FIG. 1, can be implemented in a computing device 600 in accordance with the present principles. That is, in some embodiments, forensics information, communications, data and the like can be communicated to and among containers and components of the container forensics system 100 using the computing device 600 via, for example, any input/output means associated with the computing device 600. Data associated with a container forensics system in accordance with the present principles can be presented to a user using an output device of the computing device 600, such as a display, a printer or any other form of output device.

Figure 6:
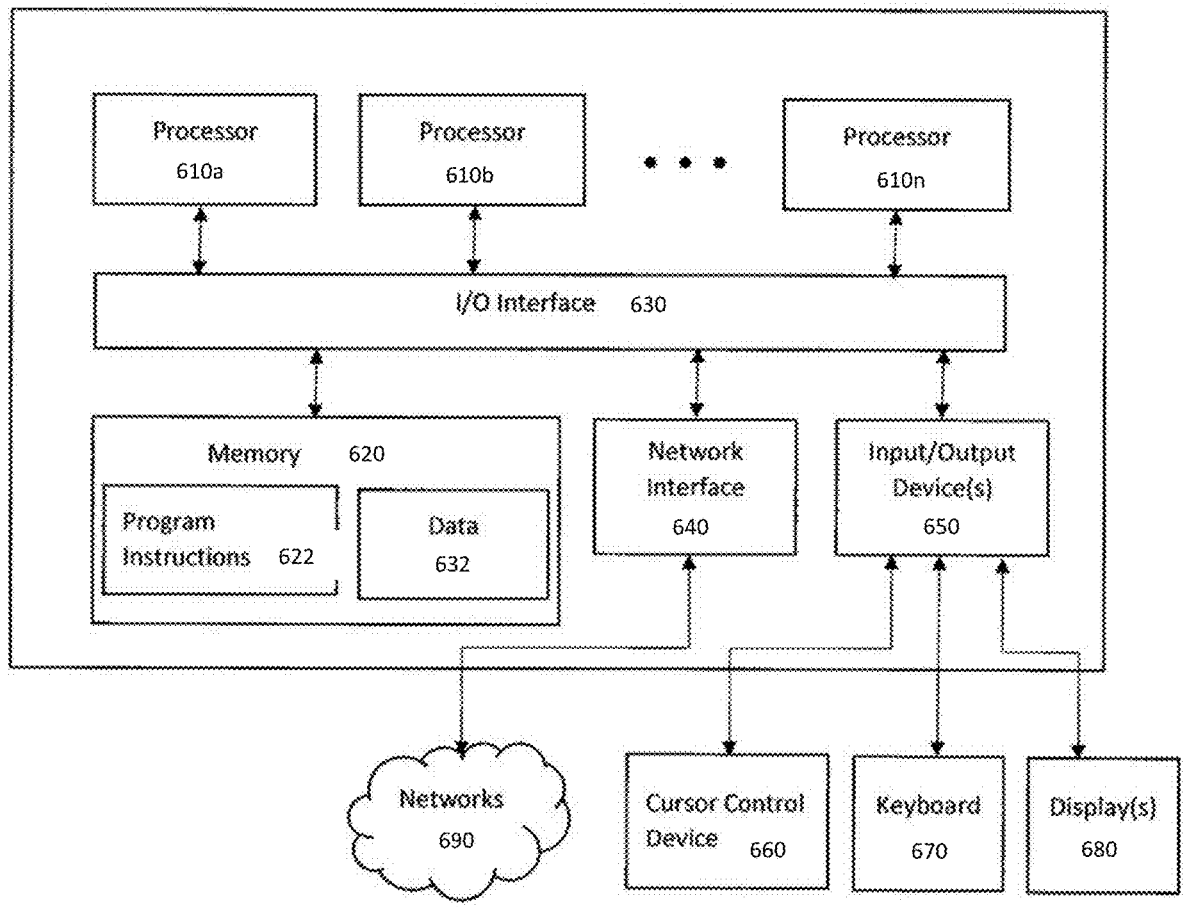
FIG. 6 depicts a high-level block diagram of a computing device suitable for use with embodiments of a container forensics system in accordance with an embodiment of the present principles.

For example, FIG. 6 depicts a high-level block diagram of a computing device 600 suitable for use with embodiments of a container forensics system in accordance with the present principles such as the container forensics system 100 of FIG. 1. In some embodiments, the computing device 600 can be configured to implement methods of the present principles as processor-executable executable program instructions 622 (e.g., program instructions executable by processor(s) 910) in various embodiments.

In the embodiment of FIG. 6, the computing device 600 includes one or more processors 610a-610n coupled to a system memory 620 via an input/output (I/O) interface 630. The computing device 600 further includes a network interface 640 coupled to I/O interface 630, and one or more input/output devices 650, such as cursor control device 660, keyboard 670, and display(s) 680. In various embodiments, a user interface can be generated and displayed on display 680. In some cases, it is contemplated that embodiments can be implemented using a single instance of computing device 600, while in other embodiments multiple such systems, or multiple nodes making up the computing device 600, can be configured to host different portions or instances of various embodiments. For example, in one embodiment some elements can be implemented via one or more nodes of the computing device 600 that are distinct from those nodes implementing other elements. In another example, multiple nodes may implement the computing device 600 in a distributed manner.

In different embodiments, the computing device 600 can be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, the computing device 600 can be a uniprocessor system including one processor 610, or a multiprocessor system including several processors 610 (e.g., two, four, eight, or another suitable number). Processors 610 can be any suitable processor capable of executing instructions. For example, in various embodiments processors 610 may be general-purpose or embedded processors implementing any of a variety of instruction set architectures (ISAs). In multiprocessor systems, each of processors 610 may commonly, but not necessarily, implement the same ISA.

System memory 620 can be configured to store program instructions 622 and/or data 632 accessible by processor 610. In various embodiments, system memory 620 can be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above can be stored within system memory 620. In other embodiments, program instructions and/or data can be received, sent or stored upon different types of computer-accessible media or on similar media separate from system memory 620 or computing device 600.

In one embodiment, I/O interface 630 can be configured to coordinate I/O traffic between processor 610, system memory 620, and any peripheral devices in the device, including network interface 640 or other peripheral interfaces, such as input/output devices 650. In some embodiments, I/O interface 630 can perform any necessary protocol, timing or other data transformations to convert data signals from one component (e.g., system memory 620) into a format suitable for use by another component (e.g., processor 610). In some embodiments, I/O interface 630 can include support for devices attached through various types of peripheral buses, such as a variant of the Peripheral Component Interconnect (PCI) bus standard or the Universal Serial Bus (USB) standard, for example. In some embodiments, the function of I/O interface 630 can be split into two or more separate components, such as a north bridge and a south bridge, for example. Also, in some embodiments some or all of the functionality of I/O interface 930, such as an interface to system memory 620, can be incorporated directly into processor 610.

Network interface 640 can be configured to allow data to be exchanged between the computing device 600 and other devices attached to a network (e.g., network 690), such as one or more external systems or between nodes of the computing device 600. In various embodiments, network 690 can include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 can support communication via wired or wireless general data networks, such as any suitable type of Ethernet network, for example; via digital fiber communications networks; via storage area networks such as Fiber Channel SANs, or via any other suitable type of network and/or protocol.

Input/output devices 650 can, in some embodiments, include one or more display terminals, keyboards, keypads, touchpads, scanning devices, voice or optical recognition devices, or any other devices suitable for entering or accessing data by one or more computer systems. Multiple input/output devices 650 can be present in computer system or can be distributed on various nodes of the computing device 600. In some embodiments, similar input/output devices can be separate from the computing device 600 and can interact with one or more nodes of the computing device 600 through a wired or wireless connection, such as over network interface 640.

Those skilled in the art will appreciate that the computing device 600 is merely illustrative and is not intended to limit the scope of embodiments. In particular, the computer system and devices can include any combination of hardware or software that can perform the indicated functions of various embodiments, including computers, network devices, Internet appliances, PDAs, wireless phones, pagers, and the like. The computing device 600 can also be connected to other devices that are not illustrated, or instead can operate as a stand-alone system. In addition, the functionality provided by the illustrated components can in some embodiments be combined in fewer components or distributed in additional components. Similarly, in some embodiments, the functionality of some of the illustrated components may not be provided and/or other additional functionality can be available.

The computing device 600 can communicate with other computing devices based on various computer communication protocols such a Wi-Fi, Bluetooth® (and/or other standards for exchanging data over short distances includes protocols using short-wavelength radio transmissions), USB, Ethernet, cellular, an ultrasonic local area communication protocol, etc. The computing device 600 can further include a web browser.

Although the computing device 600 is depicted as a general purpose computer, the computing device 600 is programmed to perform various specialized control functions and is configured to act as a specialized, specific computer in accordance with the present principles, and embodiments can be implemented in hardware, for example, as an application specified integrated circuit (ASIC). As such, the process steps described herein are intended to be broadly interpreted as being equivalently performed by software, hardware, or a combination thereof.

Figure 7:
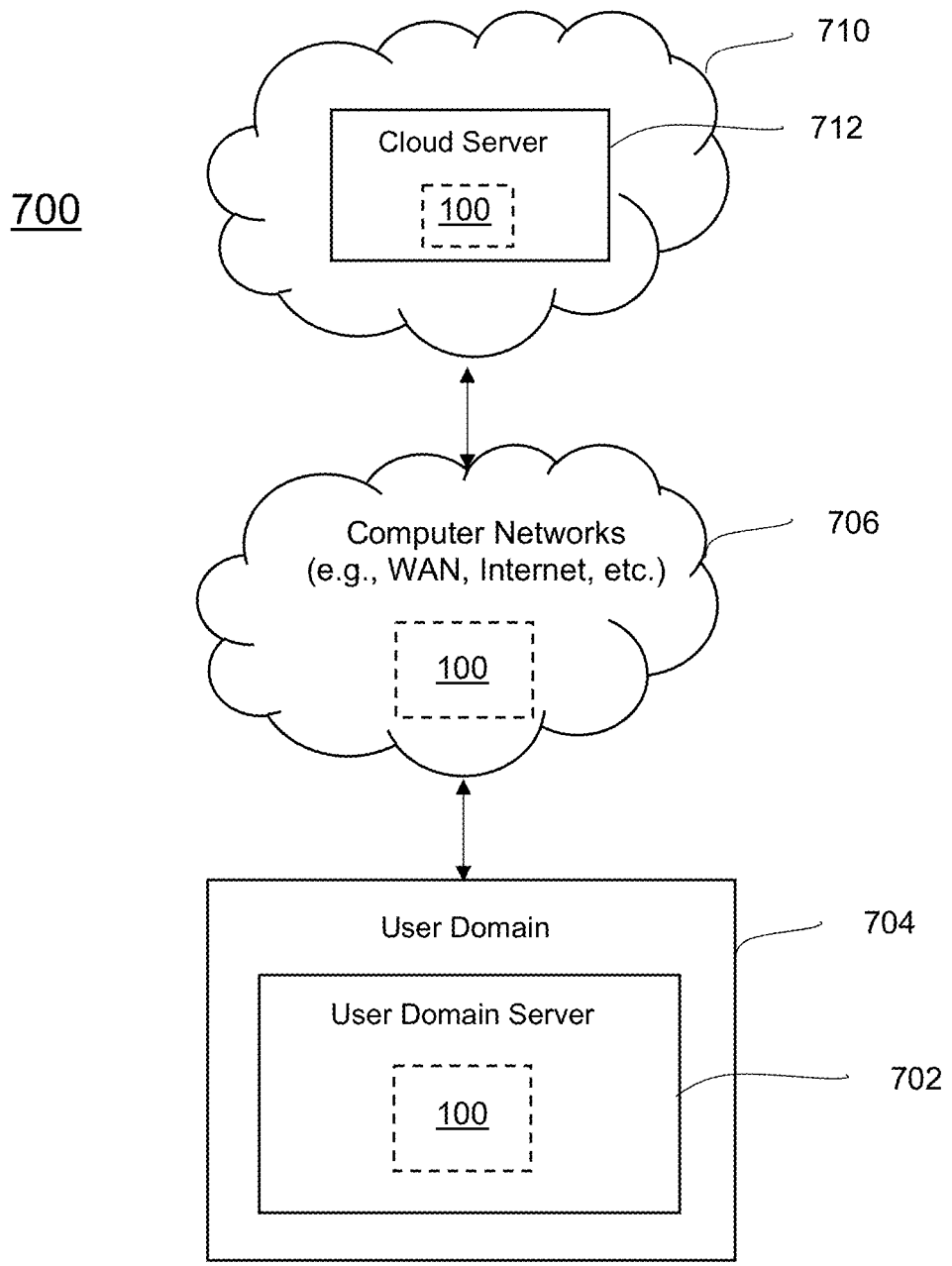
FIG. 7 depicts a high-level block diagram of a network in which embodiments of a container forensics system in accordance with the present principles, such as the container forensics system of FIG. 1, can be applied.

FIG. 7 depicts a high-level block diagram of a network in which embodiments of a container forensics system in accordance with the present principles, such as the container forensics system 100 of FIG. 1, can be applied. The network environment 700 of FIG. 7 illustratively comprises a user domain 702 including a user domain server/computing device 704. The network environment 700 of FIG. 7 further comprises computer networks 706, and a cloud environment 710 including a cloud server/computing device 712.

In the network environment 700 of FIG. 7, a system for container forensics in accordance with the present principles, such as the system 100 of FIG. 1, can be included in at least one of the user domain server/computing device 704, the computer networks 706, and the cloud server/computing device 712. That is, in some embodiments, a user can use a local server/computing device (e.g., the user domain server/computing device 704) to provide container forensics in accordance with the present principles.

In some embodiments, a user can implement a system for container forensics in the computer networks 706 to provide container forensics in accordance with the present principles. Alternatively or in addition, in some embodiments, a user can implement a system for container forensics in the cloud server/computing device 712 of the cloud environment 710 to provide container forensics in accordance with the present principles. For example, in some embodiments it can be advantageous to perform processing functions of the present principles in the cloud environment 710 to take advantage of the processing capabilities and storage capabilities of the cloud environment 710. In some embodiments in accordance with the present principles, a system for providing container forensics in a container network can be located in a single and/or multiple locations/servers/computers to perform all or portions of the herein described functionalities of a system in accordance with the present principles. For example, in some embodiments containers 110 of a container network can be located in one or more than one of the a user domain 702, the computer network environment 706, and the cloud environment 710 and at least one global manager of the present principles, such as the global manager module 130, can be located in at least one of the user domain 702, the computer network environment 706, and the cloud environment 710 for providing the functions described above either locally or remotely.

Embodiments of a container forensics system of the present principles provide many advantages over typical naïve forensics monitoring systems which collect forensics information and communicate all collected forensics information to a manager, at least because in a container forensics system of the present principles, during determined periods of stable operation of application containers only a determined, respective forensics model is communicated to a higher level manager, and only during periods of unstable operation is forensic information of a respective application container communicated to the higher level manager. For example, FIG. 8A, FIG. 8B, and FIG. 8C depicts some advantages of embodiments of a container forensics system of the present principles.

Figure 8A:
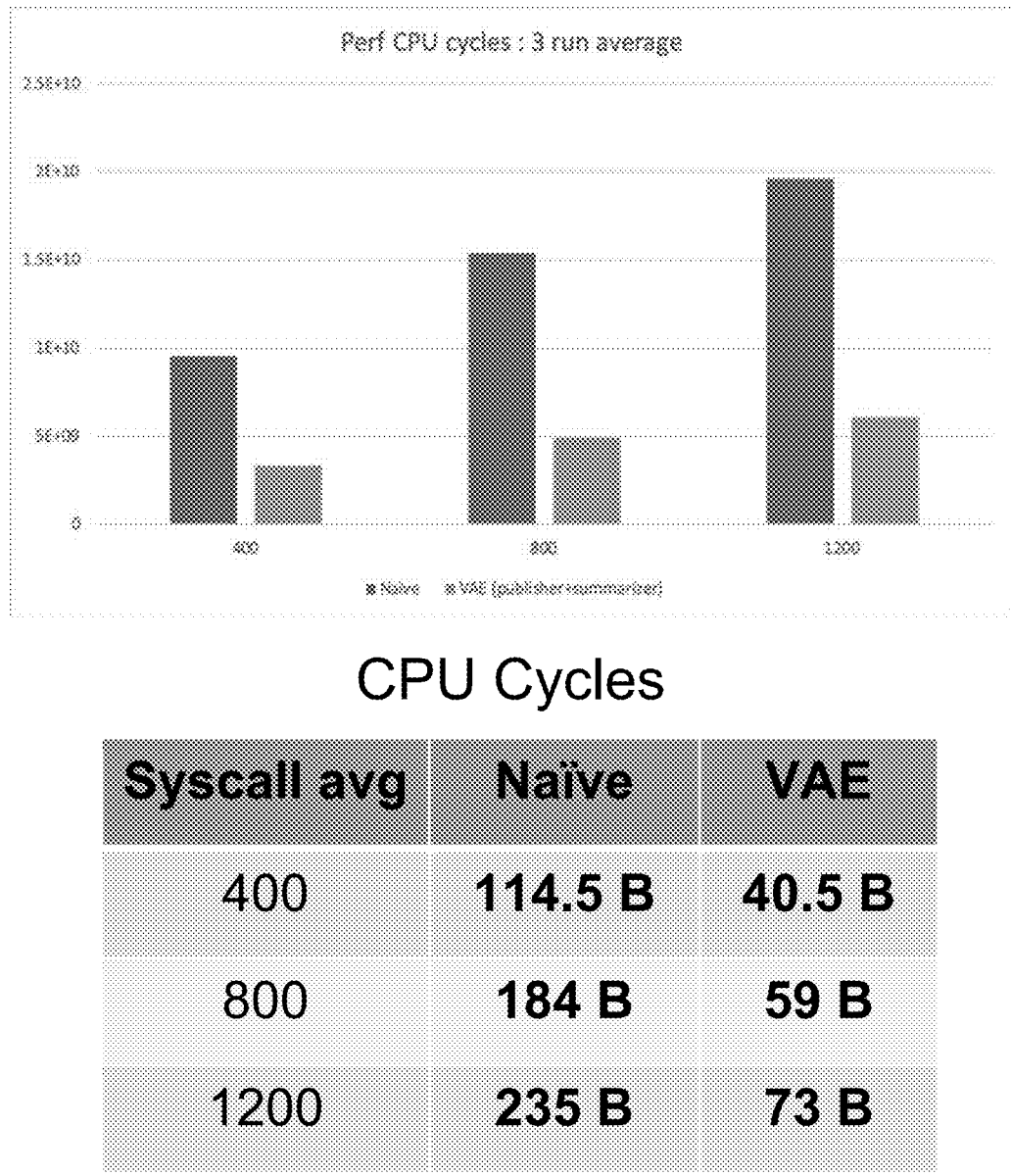
FIG. 8A depicts a graphical representation of a system cost to a host/CPU for storing forensics information for a naïve forensics monitoring system versus a container forensics system of the present principle for three different syscall loads in accordance with an embodiment of the present principles.

FIG. 8A depicts a graphical representation of a system cost to a host/CPU of storing forensics information for a naïve forensics monitoring system versus a container forensics system of the present principle, such as the container forensics system 100 of FIG. 1, for three different syscall loads. In FIG. 8A, a CPU cost for storing forensics information of an application container having a time quantum of 30 seconds for syscall loads of 400, 800 and 1200 per time quantum per hour CPU cycles is monitored. As depicted in FIG. 8A, for a syscall load of 400 syscalls per 30 second time quantum, the cost of a naïve forensics monitoring system to a host/CPU for storing forensics information of an application container is 114.5 Billion (B) cycles as compared with a cost of a container forensics system of the present principles to a host/CPU for storing the forensics information, which is 40.5 B. As depicted in FIG. 8A, for a syscall load of 800 syscalls per 30 second time quantums, the cost of a naïve forensics monitoring system to a host/CPU for storing forensics information of the application container is 184 B as compared with a cost of a container forensics system of the present principles to a host/CPU for storing the forensics information, which is 59 B. As further depicted in FIG. 8A, for a syscall load of 1200 syscalls per 30 second time quantums, the cost of a naïve forensics monitoring system to a host/CPU for storing forensics information of the application container is 235 B as compared with a cost of a container forensics system of the present principles to a host/CPU for storing the forensics information, which is 73 B. As depicted in FIG. 8A, a CPU cost associated with storing forensics information of an application container is much less for a container forensics system of the present principles as compared with a naïve forensics monitoring system across all syscall loads. In addition, a container forensics system of the present principles has the added advantage of being able to determine when the application container is operating in a stable manner. There is no such ability in a naïve forensics monitoring system.

Figure 8B:
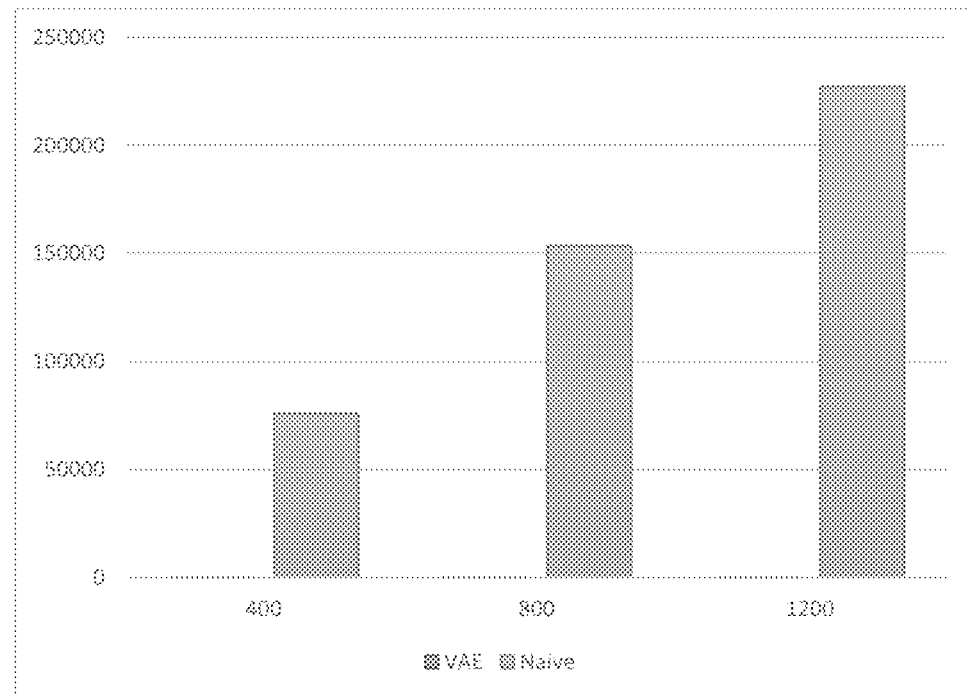
FIG. 8B depicts a graphical representation of a system cost to a host/CPU for transmitting forensics information for storage for a naïve forensics monitoring system versus a container forensics system of the present principles for three different syscall loads in accordance with an embodiment of the present principles.

FIG. 8B depicts a graphical representation of a system cost to a host/CPU of transmitting forensics information for storage for naïve forensics monitoring system versus a container forensics system of the present principles, such as the container forensics system 100 of FIG. 1 for three different syscall loads. In FIG. 8B, a bytes per second transmission rate is monitored for the transmission of forensics information (F or M) for 30 second time quantums for syscall loads of 400, 800 and 1200. As depicted in FIG. 8B, for a syscall load of 400 syscalls per 30 second time quantums, the cost of a naïve forensics monitoring system to a host/CPU for transmitting forensics information of an application container for storage is 76 Kbps as compared with a cost of a container forensics system of the present principles to a host/CPU for transmitting forensics information of an application container for storage, which is 60 Bps. As depicted in FIG. 8B, for a syscall load of 800 syscalls per 30 second time quantums, the cost of a naïve forensics monitoring system to a host/CPU for transmitting forensics information of the application container for storage is 153 Kbps as compared with a cost of a container forensics system of the present principles to a host/CPU for transmitting the forensics information for storage, which is 61 Bps. As further depicted in FIG. 8B, for a syscall load of 1200 syscalls per 30 second time quantums, the cost of a naïve forensics monitoring system to a host/CPU for transmitting forensics information of the application container for storage is 227 Kbps as compared with a cost of a container forensics system of the present principles to a host/CPU for transmitting the forensics information for storage, which is 61 Bps. As depicted in FIG. 8B, a CPU cost associated with transmitting forensics information of an application container for storage is much less for a container forensics system of the present principles as compared with a naïve forensics monitoring system across all syscall loads.

Figure 8C:
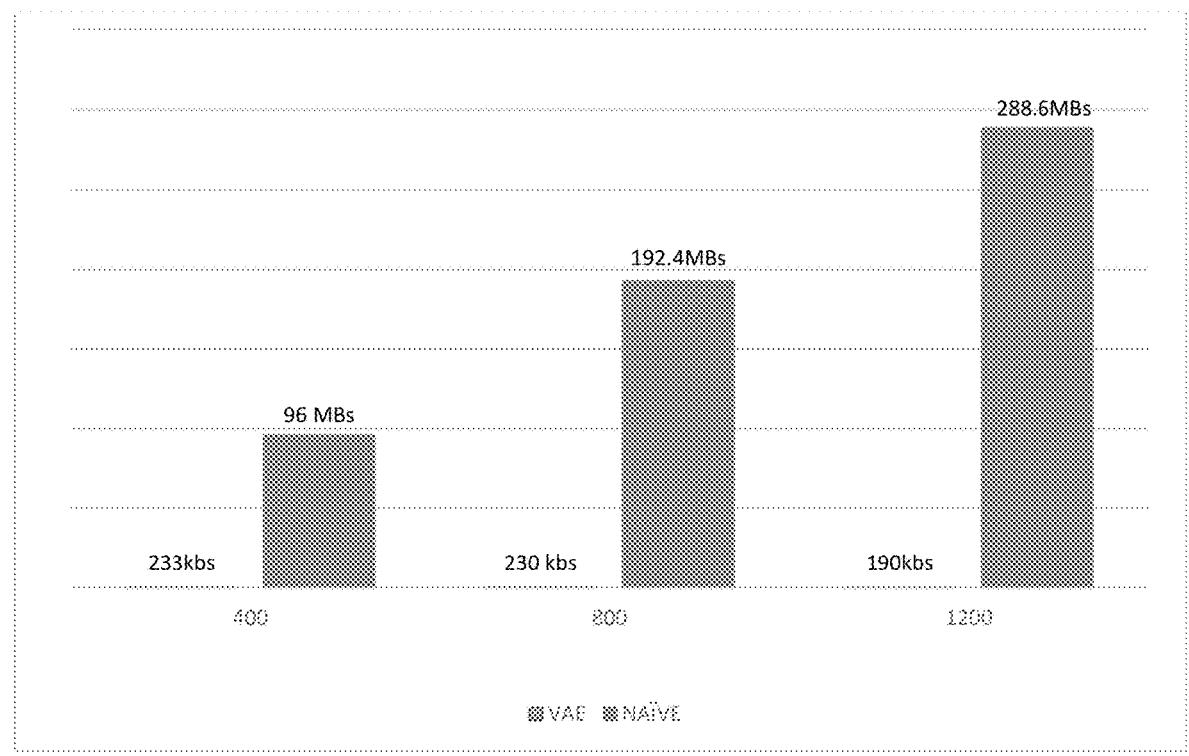
FIG. 8C depicts a graphical representation of a data storage consumption cost for storing forensics information for naïve forensics applications versus a container forensics system of the present principle for three different syscall loads in accordance with an embodiment of the present principles.

FIG. 8C depicts a graphical representation of a data storage consumption cost for storing forensics information for naïve forensics applications versus a container forensics system of the present principle, such as the container forensics system 100 of FIG. 1 for three different syscall loads. In FIG. 8C, a data storage consumption cost for storing forensics information of an application container having a time quantum of 30 seconds for syscall loads of 400, 800 and 1200 per time quantum per hour of data storage consumption is monitored. As depicted in FIG. 8C, for a syscall load of 400 syscalls per 30 second time quantum, the data consumption cost of a naïve forensics monitoring system for storing forensics information of an application container is 96 MBs as compared with a data consumption cost of a container forensics system of the present principles for storing the forensics information, which is 233 KBs. As depicted in FIG. 8C, for a syscall load of 800 syscalls per 30 second time quantums, the data consumption cost of a naïve forensics monitoring system for storing forensics information of the application container is 192 MBs as compared with a data consumption cost of a container forensics system of the present principles for storing the forensics information, which is 230 KBs. As further depicted in FIG. 8C, for a syscall load of 1200 syscalls per 30 second time quantums, the data consumption cost of a naïve forensics monitoring system for storing forensics information of the application container is 288.6 Mbs as compared with a data consumption cost of a container forensics system of the present principles for storing the forensics information, which is 190 KBs. As depicted in FIG. 8C, a data consumption cost associated with storing forensics information of an application container is much less for a container forensics system of the present principles as compared with a naïve forensics monitoring system across all syscall loads.

Embodiments of the present principles can be applied in systems such as in miniature satellite applications (e.g., CubeSats), in which containers are utilized as a payload. In this type of environment, there can be a need to maintain forensics in accordance with the present principles to be able to track what the application is doing—for example—if it gets hijacked, how it gets hijacked, were there any errors, what did it do after it had a problem or even authentication events (which may be informative data to an administrator). There is a need to track this type of information (e.g., monitor system calls, networking operations and recordings of the same).

Those skilled in the art will appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described above. In some embodiments, instructions stored on a computer-accessible medium separate from the computing device 600 can be transmitted to the computing device 600 via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer-accessible medium or via a communication medium. In general, a computer-accessible medium can include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods and processes described herein may be implemented in software, hardware, or a combination thereof, in different embodiments. In addition, the order of methods can be changed, and various elements can be added, reordered, combined, omitted or otherwise modified. All examples described herein are presented in a non-limiting manner. Various modifications and changes can be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances can be provided for components described herein as a single instance. Boundaries between various components, operations and data stores are somewhat arbitrary, and particular operations are illustrated in the context of specific illustrative configurations. Other allocations of functionality are envisioned and can fall within the scope of claims that follow. Structures and functionality presented as discrete components in the example configurations can be implemented as a combined structure or component. These and other variations, modifications, additions, and improvements can fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure can be implemented in hardware, firmware, software, or any combination thereof. Embodiments can also be implemented as instructions stored using one or more machine-readable media, which may be read and executed by one or more processors. A machine-readable medium can include any mechanism for storing or transmitting information in a form readable by a machine (e.g., a computing device or a "virtual machine" running on one or more computing devices). For example, a machine-readable medium can include any suitable form of volatile or non-volatile memory.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description. However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

This disclosure is to be considered as exemplary and not restrictive in character, and all changes and modifications that come within the guidelines of the disclosure are desired to be protected.

The invention claimed is:

1. A method for determining a global encoder/decoder pair for one or more application containers, comprising:
monitoring forensics information of an application container known to be operating in a stable manner;
applying an autoencoding process to the monitored forensics information of the application container known to be operating in the stable manner to determine an encoder/decoder pair that keeps a maximum of the forensics information when encoding and has a minimum of reconstruction error when decoding; and
applying the determined encoder/decoder pair to the monitored forensics information of the application container known to be operating in the stable manner to determine a training forensics model; and
applying the determined training forensics model to forensics information of one or more application containers to determine if the one or more application containers are operating properly;
wherein if the one or more application containers are determined to be operating properly, at least one respective forensics model is communicated to a higher-level manager to be used for higher-level management of the one or more application containers; and
wherein if it is determined that at least one of the one or more application containers is not operating properly, a respective forensics model of the at least one application container not operating properly and the monitored forensics information of the application container not operating properly is communicated to the higher-level manager to be used for higher-level management of at least the application container not operating properly.

2. The method of claim 1, further comprising:
summarizing the forensics information before applying the autoencoding process;
wherein the summarizing comprises at least one of categorizing the forensics information, and vectorizing the forensics information by a time quantum.

3. The method of claim 1, wherein the training forensics model comprises a latent code determined by an encoding process of the encoder/decoder pair, wherein the encoding process includes a neural network.

4. A method for providing process-level forensics for a plurality of application containers of container networks, comprising:
for each of the plurality of application containers;
monitoring forensics information of the application container;
encoding the monitored forensics information using an encoder of a predetermined encoder/decoder pair to determine a model representative of the monitored forensics information of the application container;
decoding the model using the decoder of the predetermined encoder/decoder pair to determine a reconstructed representation of the forensics information;
comparing the reconstructed representation of the forensics information to the monitored forensics information to determine an error;
comparing the determined error to a predetermined threshold value to determine if an error exists above the predetermined threshold value;
if no error above the predetermined threshold value is determined to exist, communicating the model representative of the monitored forensics information of the application container to a higher-level manager to be used for higher-level management of at least one of the plurality of application containers and the container networks; and
if an error above the predetermined threshold value is determined to exist, communicating the model representative of the monitored forensics information of the application container and the monitored forensics information of the application container to the higher-level manager to be used for higher-level management of at least one of the plurality of application containers and the container networks.

5. The method of claim 4, further comprising:
summarizing the forensics information before encoding the monitored forensics information;
wherein the summarizing comprises at least one of categorizing the forensics information, and vectorizing the forensics information by a time quantum.

6. The method of claim 4, wherein the predetermined encoder/decoder pair is determined by applying an autoencoding process to forensics information of an application container known to be operating in a stable manner.

7. The method of claim 4, wherein a respective application container is considered to not be operating in a stable manner when it is determined that an error exists above the predetermined threshold value.

8. The method of claim 4, wherein the higher-level manager analyzes at least one of received models and received forensics information communicated from at least one application container determined to have an error that exceeds the predetermined threshold value to determine a reason for the excessive error for the at least one application container.

9. The method of claim 4, wherein the higher-level manager determines a global model of operational characteristics of the plurality of application containers from at least one of received models and received forensics information communicated from the plurality of application containers.

10. An apparatus for providing process-level forensics for a plurality of application containers of container networks, comprising:
for each of the plurality of application containers;
a summarizing module monitoring forensics information of the application container;
an encoder of a predetermined encoder/decoder pair encoding the monitored forensics information to determine a model representative of the monitored forensics information of the application container;
the decoder of the predetermined encoder/decoder pair decoding the model to determine a reconstructed representation of the forensics information; and
a publisher/error evaluator module configured to:
compare the reconstructed representation of the forensics information to the monitored forensics information to determine an error;
compare the determined error to a predetermined threshold value to determine if an error exists above the predetermined threshold value;
if the error is below the predetermined threshold value, communicate the model representative of the monitored forensics information of the application container to a higher-level manager module to be used for higher-level management of at least one of the plurality of application containers and the container networks; and if the error is above the predetermined threshold value, communicate the model representative of the monitored forensics information of the application container and the monitored forensics information of the application container to the higher-level manager module to be used for higher-level management of at least one of the plurality of application containers and the container networks.

11. The apparatus of claim 10, further comprising a storage device for storing at least one of the monitored forensics information of the application containers and determined models of the application containers.

12. The apparatus of claim 10, wherein the higher-level manager comprises a global manager module and wherein the global manager module determines a global model of operating characteristics of the plurality of application containers of the container networks using at least one of models and forensics information received from the plurality of application containers.

13. The apparatus of claim 10, wherein the higher-level manager comprises a global manager module and wherein the global manager module determines if the operation of at least one of the plurality of application containers has drifted using at least models and forensics information received from the plurality of application containers.

14. The apparatus of claim 13, wherein the global manager module uses at least one of an unsupervised k-means cluster analysis, pairwise cosine similarity analysis or other similarity metrics to determine if the operation of at least one of the plurality of application containers has drifted.

15. The apparatus of claim 10, wherein the higher-level manager comprises a global manager module and wherein the global manager module determines a reason for a determined excessive error in at least one application container determined to have an error that exceeds the predetermined threshold using at least one of models and forensics information received from the at least one application container.

16. The apparatus of claim 15, wherein the global manager module determines the reason for the excessive error to be a deficient training model and causes a retraining of at least one training model.

17. The apparatus of claim 16, wherein the at least one training model comprises an encoder/decoder pair that keeps a maximum of the forensics information when encoding the monitored forensics information and has a minimum of reconstruction error when decoding the encoded forensics information.

18. An apparatus for providing process-level forensics for a plurality of application containers of container networks, comprising:

a processor: and a memory coupled to the processor, the memory having stored therein programs and instructions executable by the processor to configure the apparatus to:

for each of the plurality of application containers;

monitor forensics information of the application container;

encode, using an encoder of a predetermined encoder/decoder pair, the monitored forensics information to determine a model representative of the monitored forensics information of the application container;

decode the model, using a decoder of the predetermined encoder/decoder pair to determine a reconstructed representation of the forensics information;

compare the reconstructed representation of the forensics information to the monitored forensics information to determine an error;

compare the determined error to a predetermined threshold value to determine if an error exists above the predetermined threshold value; and if the error is below the predetermined threshold value, communicate the model representative of the monitored forensics information of the application container to a higher-level manager module to be used for higher-level management of at least one of the plurality of application containers and the container networks; and if the error is above the predetermined threshold value, communicate the model representative of the monitored forensics information of the application container and the monitored forensics information of the application container to the higher-level manager module to be used for higher-level management of at least one of the plurality of application containers and the container networks.

19. The apparatus of claim 18, wherein the higher-level manager comprises a global manager module and wherein the global manager module at least one of determines a global model of operating characteristics of the plurality of application containers of the container networks using at least one of models and forensics information received from the plurality of application containers or determines if the operation of at least one of the plurality of application containers has drifted using at least models and forensics information received from the plurality of application containers.

* * * * *